(12) United States Patent
Otsuki

(10) Patent No.: US 8,281,893 B2
(45) Date of Patent: Oct. 9, 2012

(54) VARIABLE TRANSMISSION RATIO MECHANISM AND VARIABLE RATIO STEERING DEVICE

(75) Inventor: Hidetaka Otsuki, Kashiwara (JP)

(73) Assignee: Jtekt Corporation, Osaka-Shi (JP)

( * ) Notice: Subject to any disclaimer, the term of this patent is extended or adjusted under 35 U.S.C. 154(b) by 0 days.

(21) Appl. No.: 13/001,722

(22) PCT Filed: Jun. 26, 2009

(86) PCT No.: PCT/JP2009/002966
§ 371 (c)(1),
(2), (4) Date: Dec. 28, 2010

(87) PCT Pub. No.: WO2010/001569
PCT Pub. Date: Jan. 7, 2010

(65) Prior Publication Data
US 2011/0108356 A1    May 12, 2011

(30) Foreign Application Priority Data

Jun. 30, 2008    (JP) .................................. 2008-171132

(51) Int. Cl.
*B62D 5/04*    (2006.01)
*F16H 1/12*    (2006.01)
(52) U.S. Cl. ........................... 180/444; 180/447; 74/416
(58) Field of Classification Search .............. 180/4, 440, 180/443, 444
See application file for complete search history.

(56) References Cited

U.S. PATENT DOCUMENTS

2007/0209861 A1* 9/2007 Kruttschnitt et al. ......... 180/444
2009/0200100 A1* 8/2009 Arbanas ........................ 180/447

FOREIGN PATENT DOCUMENTS

| DE | 10 2004 052 562 B3 | 2/2006 |
|---|---|---|
| JP | U-59-39346 | 3/1984 |
| JP | A-10-184819 | 7/1998 |
| JP | A-2006-46405 | 2/2006 |
| JP | A-2006-82718 | 3/2006 |
| JP | A-2006-88726 | 4/2006 |
| JP | A-2007-170624 | 7/2007 |
| JP | A-2008-30747 | 2/2008 |

OTHER PUBLICATIONS

International Search Report for International Patent Application No. PCT/JP2009/002966, mailed on Oct. 6, 2009 (w/ English translation).
International Preliminary Report on Patentability for International Patent Application No. PCT/JP2009/002966, mailed on Feb. 8, 2011 (w/ English translation).
Jul. 5, 2012 Search Report issued in European Patent Application No. 09773147.5.

* cited by examiner

*Primary Examiner* — Tashiana Adams
*Assistant Examiner* — Jacob Knutson
(74) *Attorney, Agent, or Firm* — Oliff & Berridge, PLC

(57) ABSTRACT

A variable transmission ratio mechanism comprises: an input member capable of rotating around a first axis; and an intermediate member that allows the differential rotation of the output member. The intermediate member is capable of rotating around a second axis that is slanted relative to the first axis. On first and second power transmission surfaces of the intermediate member, corresponding first and second engaging sections are respectively arranged according to corresponding first and second arrangement pitch circles centered on the second axis. On corresponding first and second engagement circles centered on the first axis, the first and second engaging sections are respectively engageable with corresponding first and second engageable sections. The diameter of the first arrangement pitch circle differs from the diameter of the second arrangement pitch circle.

8 Claims, 12 Drawing Sheets

FIG. 5
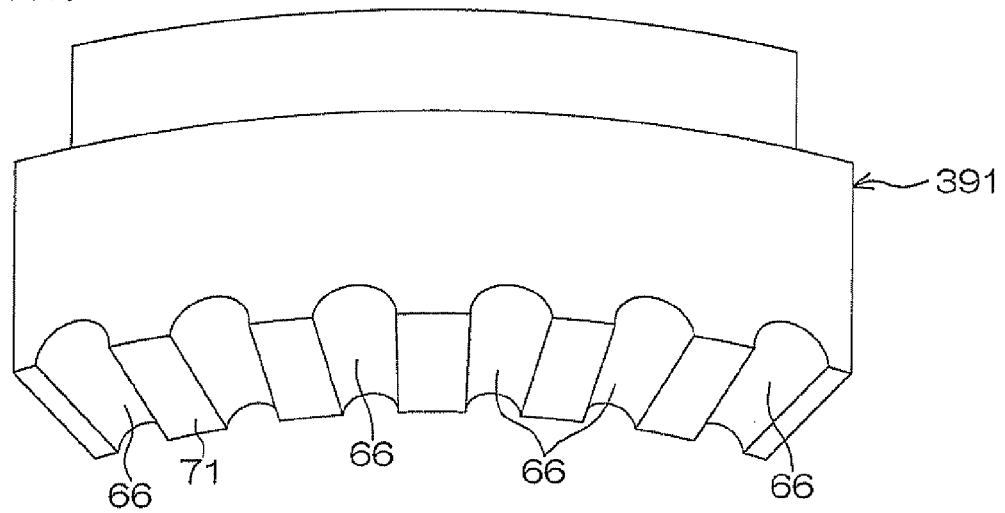
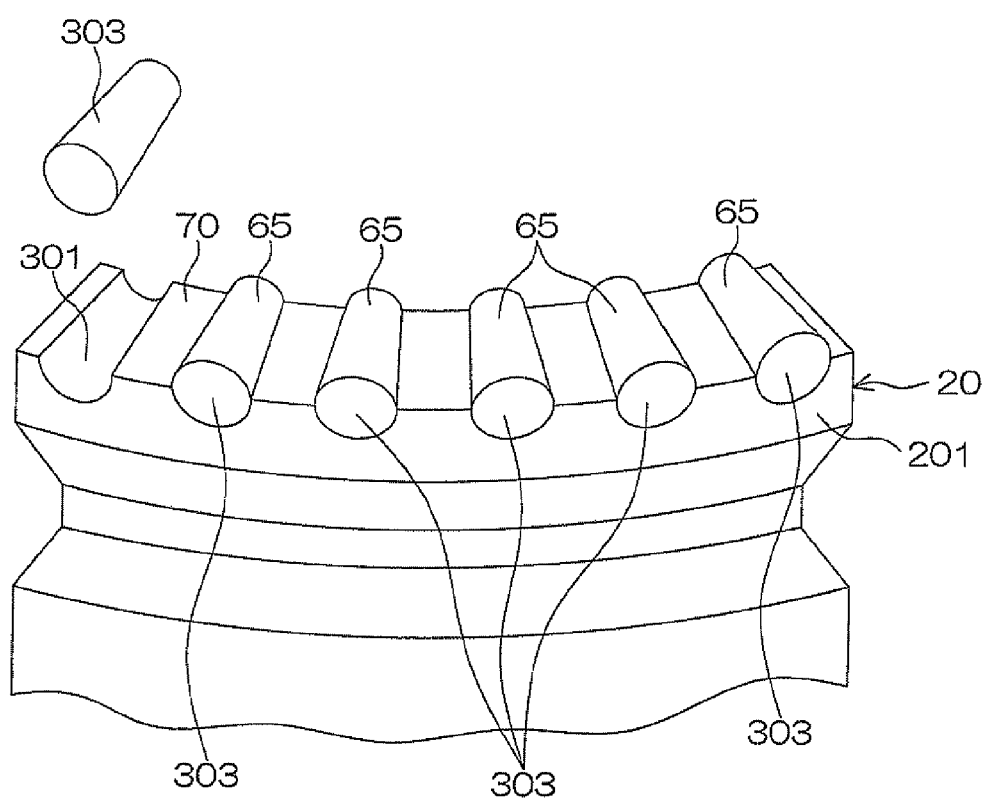

FIG. 7
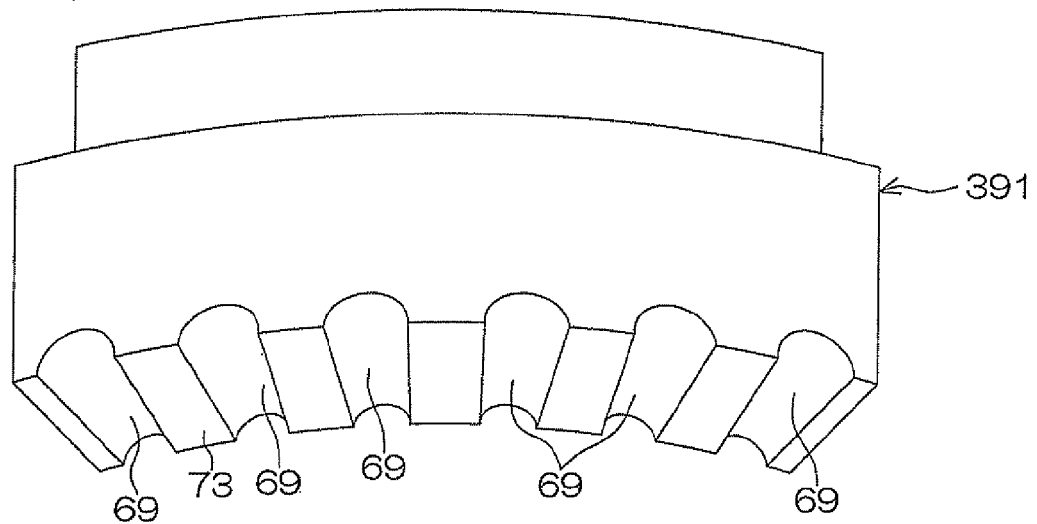
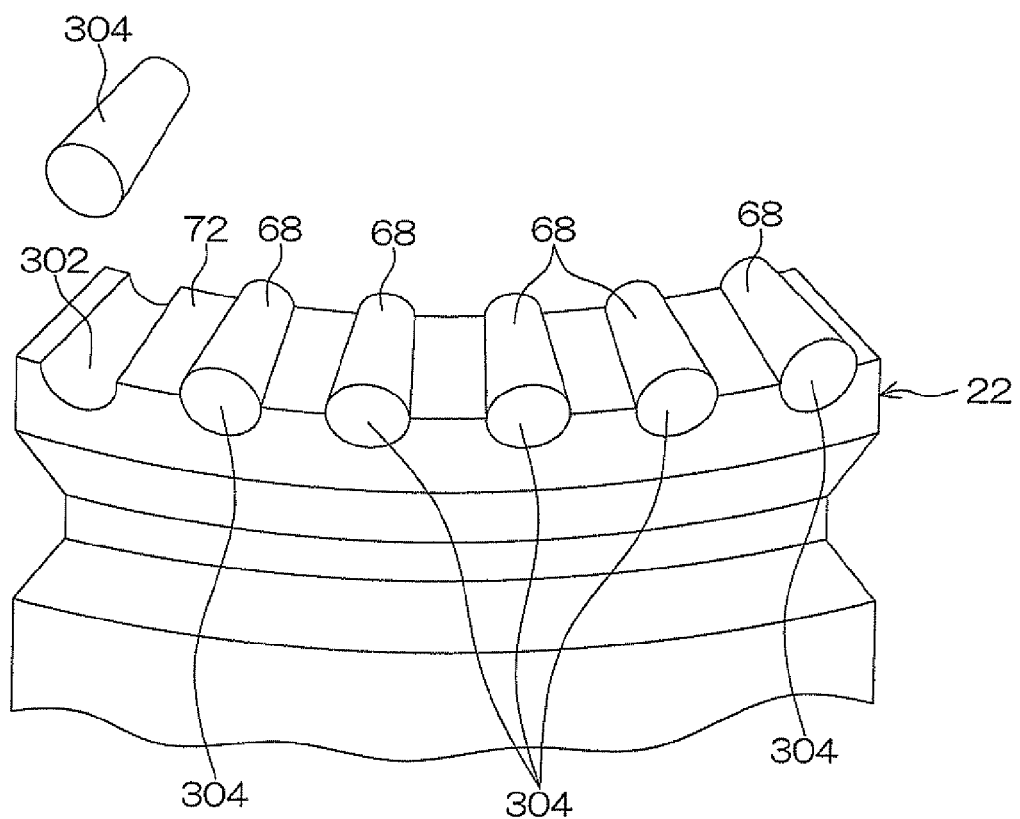

VARIABLE TRANSMISSION RATIO MECHANISM AND VARIABLE RATIO STEERING DEVICE

TECHNICAL FIELD

The present invention relates to a variable transmission ratio mechanism and a variable ratio steering device.

BACKGROUND ART

In a steering angle variable ratio steering device, noise reduction by using a so-called Coriolis movement gear has been proposed (for example, refer to Patent Document 1).

In Patent document 1, on both sides of a rocking gear that Coriolis-moves, an input gear and an output gear are disposed, and are engaged with the rocking gear.

PRIOR ART DOCUMENT

Patent Document

Patent Document 1: Japanese Published Unexamined Patent Application No. 2006-82718

SUMMARY OF THE INVENTION

Problem to be Solved by the Invention

In a steering device including a rocking gear that Coriolis-moves, in order to further reduce noise, improvement in the contact ratio is considered.

However, in this case, it is necessary to reduce the slant angle of the rocking gear. In order to reduce the slant angle of the rocking gear while the diameters of the intermeshing pitch circles (PCD: Pitch Circle Diameters) between the rocking gear and the corresponding input gear and output gear are kept constant, the axial length of the rocking gear must be increased. In this case, the steering device increases in size in the axial direction.

Therefore, reduction of the intermeshing pitch circle diameters between the rocking gear and the corresponding input gear and output gear is considered, however, usually, an upper shaft and a lower shaft penetrates through the radially inner side of the rocking gear, so that there is a limit to reducing the diameter of the rocking gear.

Means for Solving the Problem

An object of the present invention is to provide a downsized variable transmission ratio mechanism and variable ratio steering device that can reduce noise.

In order to achieve the above-described object, a variable transmission ratio mechanism of a preferred embodiment of the present invention includes an input member rotatable around a first axis, an output member rotatable around the first axis, and an intermediate member joining the input member and the output member so as to allow the input member and the output member to rotate differentially. The intermediate member is rotatable around a second axis slanted with respect to the first axis. The input member includes a first power transmission surface, and the intermediate member includes a first power transmission surface facing to the first power transmission surface of the input member. On the first power transmission surface of the intermediate member, a plurality of first engaging sections is arranged along a first arrangement pitch circle centered on the second axis. On the first power transmission surface of the input member, a plurality of first engageable sections is arranged annularly around the first axis. The first engaging sections are engageable with the first engageable sections on a first engagement circle centered on the first axis. The output member includes a second power transmission surface, and the intermediate member includes a second power transmission surface facing to the second power transmission surface of the output member. On the second power transmission surface of the intermediate member, a plurality of second engaging sections is arranged along a second arrangement pitch circle centered on the second axis. On the second power transmission surface of the output member, a plurality of second engageable sections is arranged annularly around the first axis. The second engaging sections are engageable with the second engageable sections on a second engagement circle centered on the first axis. A diameter of the first arrangement pitch circle and a diameter of the second arrangement pitch circle are different from each other.

According to the present aspect, in the intermediate member, the diameter of the first arrangement pitch circle concerning the first engaging sections of the first power transmission surface and the diameter of the arrangement pitch circle concerning the second engageable sections on the second power transmission surface are made different from each other.

Accordingly, without changing the diameter of the first engagement circle and the diameter of the second engagement circle centered on the first axis and without increasing the slant angle of the second axis that is the shaft center of the intermediate member, the width of the intermediate member in a direction along the second axis can be narrowed.

In the intermediate member, the diameter of the arrangement pitch circle concerning the first engaging sections on the first power transmission surface and the diameter of the arrangement pitch circle concerning the second engaging sections on the second power transmission surface are different from each other, so that in the intermediate member, the first and second power transmission surfaces can be easily discriminated from each other. Therefore, the intermediate member can be prevented from being erroneously fitted.

The variable transmission ratio mechanism further includes an electric motor for driving the intermediate member, and provision of the electric motor including an annular rotor disposed on the radially outer side of the intermediate member is preferable in the following respect. That is, as described above, the width of the intermediate member in the direction along the second axis can be narrowed, so that the rotor can be shortened in the axial direction. As a result, the inertia of the rotor can be reduced and the responsiveness of the electric motor can be improved.

BRIEF DESCRIPTION OF THE DRAWINGS

FIG. 5 is an exploded perspective view of an essential portion of an input member and an inner race.

FIG. 7 is an exploded perspective view of an essential portion of an output member and an inner race.

BEST MODE FOR CARRYING OUT THE INVENTION

Preferred embodiments of the present invention will be described with reference to the accompanying drawings.

Figure 1:
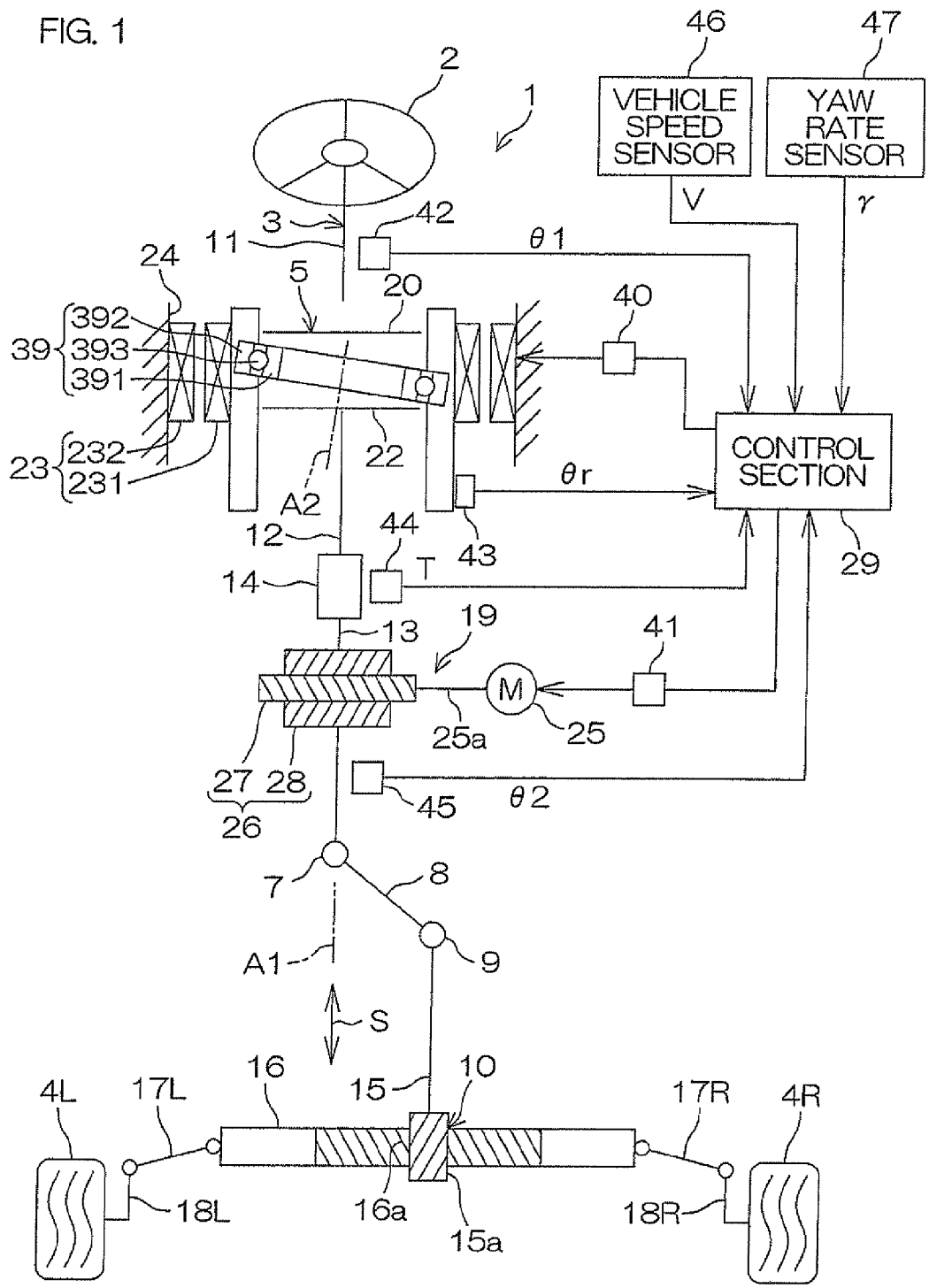
FIG. 1 is a schematic view showing a general configuration of a variable ratio steering device according to an embodiment of the present invention.

FIG. 1 is a schematic view showing a general configuration of a variable ratio steering device 1 including a variable transmission ratio mechanism according to an embodiment of the present invention. Referring to FIG. 1, the variable ratio steering device 1 performs turning by applying a steering torque applied to the steering member 2 such as a steering wheel to left and right steerable wheels 4L and 4R via a steering shaft 3, etc., as a steering shaft. The variable ratio steering device 1 has a VGR (Variable Gear Ratio) function capable of varying a transmission ratio θ2/θ1 as a ratio (steering angle ratio) of the steerable angle θ2 of the steerable wheels 4L, and 4R to the steering angle θ1 of the steering member 2.

The variable ratio steering device 1 includes a steering member 2 and a steering shaft 3 connected to the steering member 2. The steering shaft 3 includes first to third shafts 11 to 13 as first to third shafts disposed coaxially. A first axis A1 as a central axis of the first to third shafts 11 to 13 is a rotational axis of the first to third shafts 11 to 13.

The steering member 2 is joined to one end of the first shaft 11 rotatably integrally with the first shaft. The other end of the first shaft 11 and one end of the second shaft are joined differentially rotatably via a variable transmission ratio mechanism 5 as a variable steering angle ratio mechanism. The other end of the second shaft 12 and one end of the third shaft 13 are joined via a torsion bar 14 so as to resiliently rotate relative to each other in a predetermined range and transmit power.

The other end of the third shaft 13 is connected to the steerable wheels 4L and 4R via a universal joint 7, an intermediate shaft 8, a universal joint 9, and a steerable mechanism 10, etc.

The steerable mechanism 10 includes a pinion shaft 15 connected to the universal joint 9, and a rack shaft 16 as a steerable shaft including a rack 16a that engages with a pinion 15a on the tip end of the pinion shaft 15 and extending in the left-right direction of a vehicle. To the pair of end portions of the rack shaft 16, knuckle arms 18L and 18R are joined via tie rods 17L and 17R, respectively.

With the above-described configuration, rotation of the steering member 2 is transmitted to the steerable mechanism 10 via the steering shaft 3, etc. In the steerable mechanism 10, rotation of the pinion 15a is converted into movement in the axial direction of the rack shaft 16. The movement in the axial direction of the rack shaft 16 is transmitted to the corresponding knuckle arms 18L and 18R via the tie rods 17L and 17R to turn the knuckle arms 18L and 18R. Accordingly, the corresponding steerable wheels 4L and 4R joined to the knuckle arms 18L and 18R are steered.

The variable transmission ratio mechanism 5 as a steering angle ratio variable mechanism is for changing a rotation transmission ratio (a transmission ratio θ2/θ1 as a steering angle ratio) between the first and second shafts 11 and 12 of the steering shaft 3, and is a nutation gear mechanism. This variable transmission ratio mechanism 5 includes an input member 20 provided on the other end of the first shaft 11 joined to the steering member 2, an output member 22 provided on one end of the second shaft 12 as a steerable wheel side member, and a bearing ring unit 39 interposed between the input member 20 and the output member 22.

The input member 20 is joined to the steering member 2 and the first shaft 11 coaxially and rotatably integrally, and the output member 22 is joined to the second shaft 12 coaxially and rotatably integrally. The first axis A1 is a central axis of the input member 20 and the output member 22, and is also a rotational axis of the input member 20 and the output member 22. The output member 22 is connected to the steerable wheels 4L and 4R via the second shaft 12 and the steerable mechanism 10, etc.

The bearing ring unit 39 forms a four-point contact bearing by including an inner race 391 as a first bearing ring providing an intermediate member, an outer race 392 as a second bearing ring, and a roller 393 such as a ball interposed between the inner race 391 and the outer race 392. As the roller 393, any of the cylindrical roller, a needle roller, and a conical roller may be used. The bearing formed by the bearing ring unit 39 may be a single-row bearing or a double-row bearing. In the case of a double-row bearing, the inner race 391 can be prevented from tilting. As a double-row bearing, a double-row angular bearing can be used.

The inner race 391 functions as an intermediate member that joins the input member 20 and the output member 22 differentially rotatably. The inner race 391 and the outer race 392 have a second axis A2 as a central axis slanted with respect to the first axis A1. The inner race 391 is supported rotatably on the outer race 392 as a second bearing ring via the roller 393. Therefore, the inner race is rotatable around the second axis A2, and rotatable around the first axis A1 according to driving of a variable transmission ratio motor 23 that is an electric motor as an actuator for driving the outer race 392. The inner race 391 and the outer race 392 can Coriolis-move (nutate) around the first axis A1.

The variable transmission ratio motor 23 is disposed on the radially outer side of the bearing ring unit 39 around the first axis A1 of the bearing ring unit 39. The variable transmission ratio motor 23 changes the transmission ratio θ2/θ1 as a steering angle ratio by changing the rotation speed of the outer race 392 around the first axis A1.

The variable transmission ratio motor 23 consists of, for example, a brushless motor disposed coaxially with the steering shaft 3. The variable transmission ratio motor 23 includes a rotor 231 holding the bearing ring unit 39 and a stator 232 surrounding the rotor 231 and fixed to a housing 24 as a steering column. The rotor 231 rotates around the first axis A1.

The variable ratio steering device 1 includes a steering-assist-force application mechanism 19 that applies a steering-assist-force to the steering shaft 3. The steering-assist-force application mechanism 19 includes the second shaft 12 as an input shaft connected to the output member 22 of the variable transmission ratio mechanism 5, the third shaft 13 as an output shaft connected to the steerable mechanism 10, a torque sensor 44 described later that detects a torque to be transmitted between the second shaft 12 and the third shaft 13, a steering assist motor 25 as a steering assist actuator, and a reduction gear mechanism 26 interposed between the steering assist motor 25 and the third shaft 13.

The steering assist motor 25 consists of an electric motor such as a brushless motor. An output of this steering assist motor 25 is transmitted to the third shaft 13 via the reduction gear mechanism 26.

The reduction gear mechanism 26 consists of, for example, a worm gear mechanism, and includes a worm shaft 27 as a drive gear joined to an output shaft 25a of the steering assist motor 25, and a worm wheel 28 as a driven gear engaging with the worm shaft 27 and joined rotatably integrally to the third shaft 13. The reduction gear mechanism 26 is not limited to the worm gear mechanism, and other gear mechanisms such as a parallel shaft gear mechanism using a spur gear and a helical gear may be used.

The variable transmission ratio mechanism 5 and the steering-assist-force application mechanism 19 are housed in the housing 24. The housing 24 is disposed inside a cabin of the vehicle. The housing 24 may be disposed so as to surround the intermediate shaft 8 or may be disposed inside an engine room of the vehicle.

Driving of the variable transmission ratio motor 23 and the steering assist motor 25 is controlled by a control section 29 including a CPU, a RAM, and a ROM. The control section 29 is connected to the variable transmission ratio motor 23 via a driving circuit 40, and connected to the steering assist motor 25 via a driving circuit 41.

To the control section 29, a steering angle sensor 42 as a steering state detection sensor, a motor resolver 43 as a rotation angle detection means for detecting a rotation angle of the variable transmission ratio motor 23, and a torque sensor 44, a steerable angle sensor 45, a vehicle speed sensor 46, and a yaw rate sensor 47 as steering state detection sensors are connected.

Signals from the sensors 42 to 47 are input into the control section 29. In detail, from the steering angle sensor 42, as a value corresponding to a steering angle $\theta 1$ that is an operation amount from a straight traveling position of the steering member 2, a signal concerning a rotation angle of the first shaft 11 is input. From the motor resolver 43, a signal concerning a rotation angle $\theta r$ of the rotor 231 of the variable transmission ratio motor 23 is input.

From the torque sensor 44, as a value corresponding to a steering torque T applied to the steering member 2, a signal concerning a torque applied between the second and third shafts 12 and 13 is input. From the steerable angle sensor 45, a signal concerning a rotation angle of the third shaft 13 as a value corresponding to a steerable angle $\theta 2$ is input. From the vehicle speed sensor 46, a signal concerning a vehicle speed V is input. From the yaw rate sensor 47, a signal concerning a yaw rate $\gamma$ is input.

The control section 29 controls driving of the variable transmission ratio motor 23 and the steering assist motor 25 based on signals input from the sensors 42 to 47.

With the above-described configuration, an output of the variable transmission ratio mechanism 5 is transmitted to the steerable mechanism 10 via the steering-assist-force application mechanism 19. In detail, a steering torque input into the steering member 2 is input into the input member 20 of the variable transmission ratio mechanism 5 via the first shaft 11, and further transmitted from the output member 22 to the second shaft 12 of the steering-assist-force application mechanism 19. The steering torque transmitted to the second shaft 12 is transmitted to the torsion bar 14 and the third shaft 13, and combined with the output from the steering assist motor 25 and transmitted to the steerable mechanism 10 via the intermediate shaft 8, etc.

Figure 2:
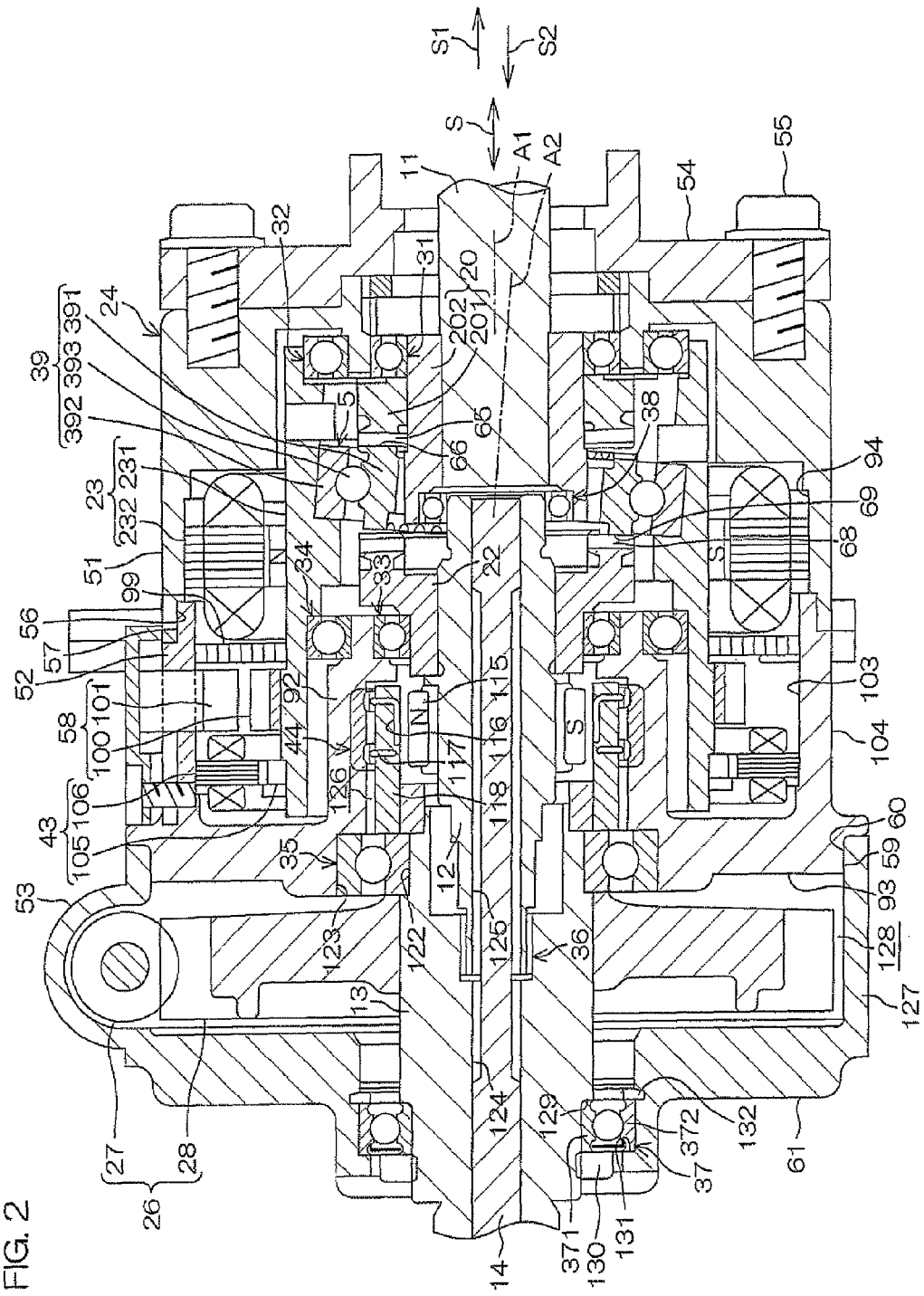
FIG. 2 is a sectional view showing a detailed configuration of an essential portion of FIG. 1.

FIG. 2 is a sectional view showing a detailed configuration of an essential portion of FIG. 1. Referring to FIG. 2, the housing 24 is formed by shaping a metal such as an aluminum alloy into a cylindrical shape, and includes a first housing 51, a second housing 52, and a third housing 53. Inside the housing 24, a first bearing 31, a second bearing 32, a third bearing 33, a fourth bearing 34, a fifth bearing 35, a sixth bearing 36, a seventh bearing 37, and an eighth bearing 38 are housed. The first to fifth bearings 31 to 35 and the seventh and eighth bearings 37 and 38 are rolling bearings such as angular roller bearings. The sixth bearing 36 is a rolling bearing such as a needle roller bearing.

The first housing 51 has a cylindrical shape. The first housing 51 forms a differential mechanism housing that houses the variable transmission ratio mechanism 5 as a differential mechanism, and forms a motor housing that houses the variable transmission ratio motor 23. One end of the first housing 51 is covered by an end wall 54. One end of the first housing 51 and the end wall 54 are fixed to each other by using a fastening member 55 such as a bolt. To the inner peripheral surface 56 on the other end of the first housing 51, an annular convex portion 57 on one end of the first housing 52 is fitted. These first and second housings 51 and 52 are fixed to each other by using a fastening member (not shown) such as a bolt.

The second housing 52 has a cylindrical shape. The second housing 52, forms a sensor housing that houses the torque sensor 44, and forms a resolver housing that houses the motor resolver 43. The second housing 52 houses a bus bar 99 described later of the variable transmission ratio motor 23, and a lock mechanism 58 for locking the rotor 231 of the variable transmission ratio motor 23. To the outer peripheral surface 59 on the other end of the second housing 52, the inner peripheral surface 60 on one end of the third housing 53 is fitted.

The third housing 53 has a cylindrical shape, and forms a reduction gear mechanism housing that houses the reduction gear mechanism 26. On the other end of the third housing 53, an end wall portion 61 is provided. The end wall portion 61 has an annular shape, and covers the other end of the third housing 53.

Figure 3:
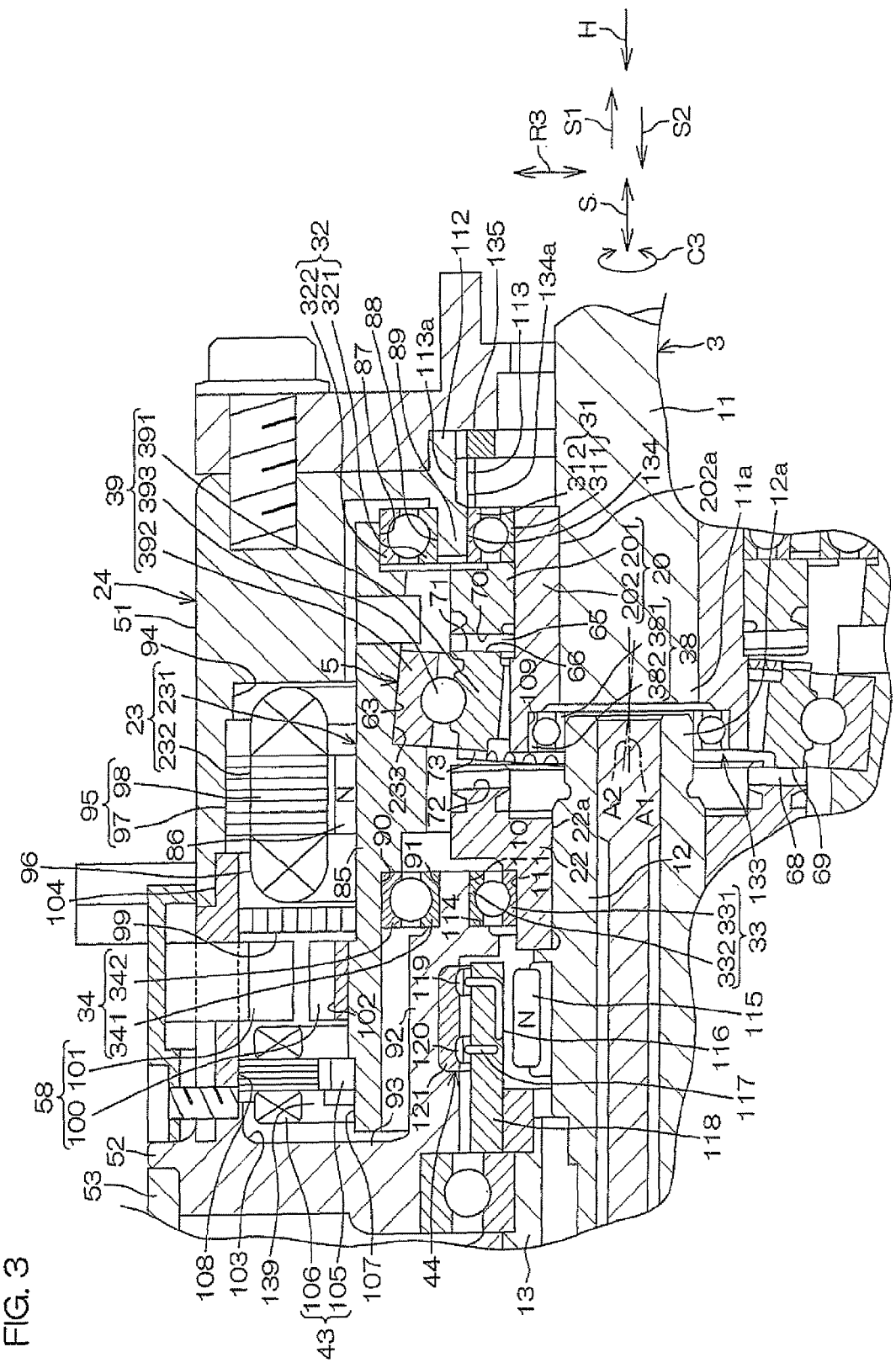
FIG. 3 is an enlarged view of a variable transmission ratio mechanism of FIG. 2 and the periphery thereof.

FIG. 3 is an enlarged view of the variable transmission ratio mechanism 5 of FIG. 2 and the periphery thereof. Referring to FIG. 3, the input member 20, the output member 22, and the inner race 391 of the variable transmission ratio mechanism 5 are annular.

The input member 20 includes an input member main body 201 and a cylindrical member 202 disposed on the radially inner side of the input member main body 201 and joined to the input member main body 201 rotatably integrally.

The first shaft 11 is joined to the cylindrical member 202 rotatably integrally by being inserted through an insertion hole 202a of the cylindrical member 202.

The second shaft 12 is joined to the output member 22 rotatably integrally by being inserted through an insertion hole 22a of the output member 22.

Facing end sections 11a and 12a facing to each other of the first shaft 11 and the second shaft 12 are supported coaxially and rotatably relative to each other by a support mechanism 133. The support mechanism 133 includes the cylindrical member 202 and the eighth bearing 38. Specifically, the cylindrical member 202 forms a part of the input member 20 and forms a part of the support mechanism 133.

The cylindrical member 202 surrounds the facing end sections 11a and 12a of the first and second shafts 11 and 12. One end of the cylindrical member 202 faces to the first bearing 31 in the radial direction. The other end of the cylindrical member 202 faces to the facing end section 12a of the second shaft 12 in the radial direction.

In the other end of the cylindrical member 202, a bearing holding hole 109 is formed, and the facing end section 12a of the second shaft 12 is inserted through the bearing holding hole 109. The eighth bearing 38 is interposed between the facing end section 12a of the second shaft 12 and the bearing holding hole 109, and by the eighth bearing 38, the cylindrical member 202 and the second shaft 12 are allowed to rotate relative to each other.

It is also possible that the cylindrical member 20 is joined to the facing end section 12a of the second shaft 12 rotatably integrally, and the eighth bearing 38 is interposed between the cylindrical member 202 and the facing end section 11a of the first shaft 11.

The inner race 391 as an intermediate member is disposed on the radially outer side of the cylindrical member 202. The outer race 392 is held in the slanted hole 63 formed in an inner peripheral portion 233 of the rotor 231 of the variable transmission ratio motor 23 rotatably integrally. The outer race 392 and the rotor 231 rotate integrally around the first axis A1. The slanted hole 63 has a central axis set on the second axis A2. According to rotation around the first axis A1 of the rotor 231, the bearing ring unit 39 Coriolis-moves.

It is also possible that by the outer race 392 of the bearing ring unit 39, the input member 20 and the output member 22 are joined differentially rotatably and the inner race 391 is joined to the rotor 231 of the transmission ratio variable motor 23 rotatably integrally. In this case, the bearing ring unit 39 is an inner race support type.

Figure 4:
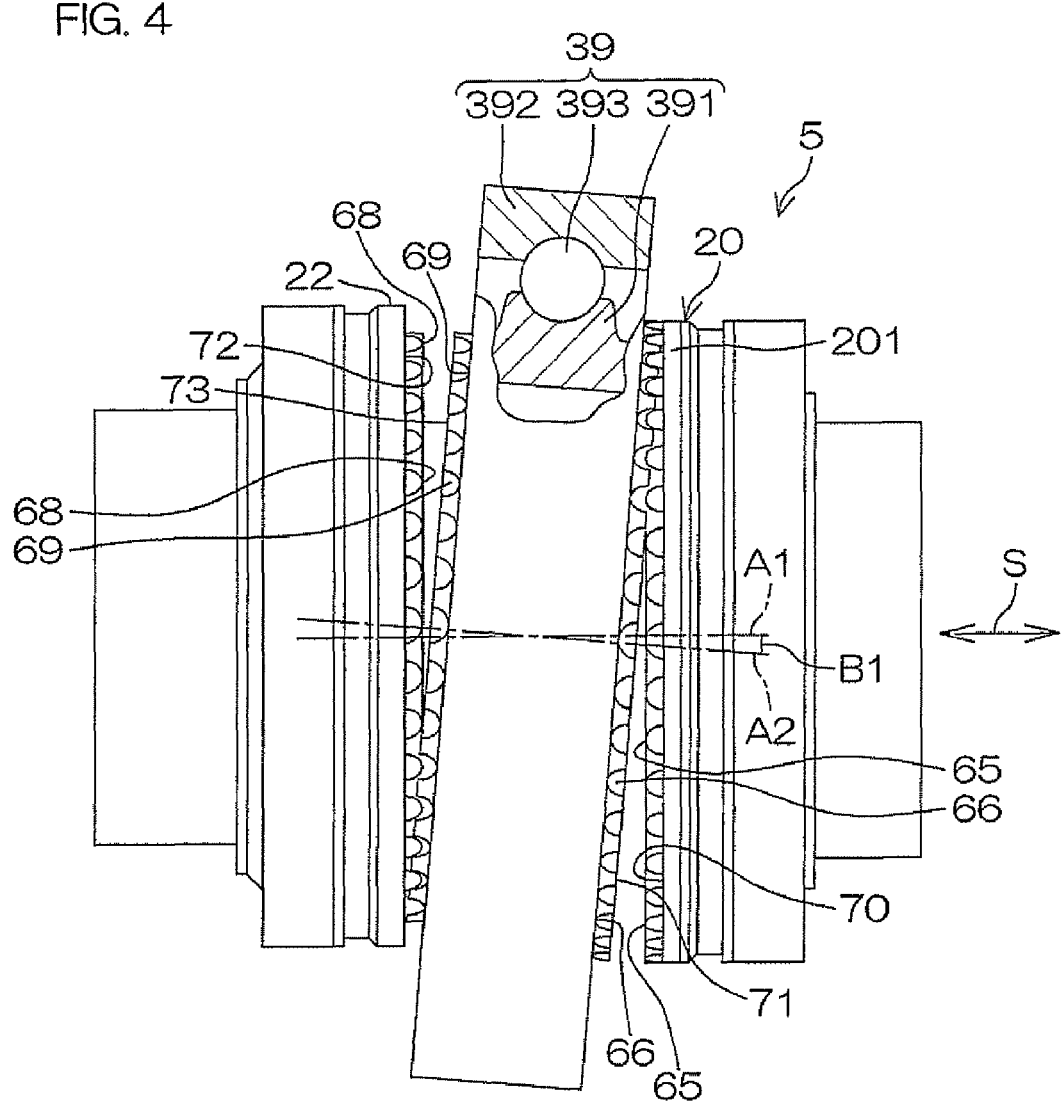
FIG. 4 is a side view showing a part of the variable transmission ratio mechanism in a section.

FIG. 4 is a side view showing a part of the variable transmission ratio mechanism 5 in a section. Referring to FIG. 3 and FIG. 4, the input member main body 201 and the inner race 391 include, respectively, first power transmission surfaces 70 and 71 facing to each other in the axial direction S of the steering shaft 3. On the first power transmission surface 70 of the input member main body 201, first convex portions 65 as first engageable sections are provided, and on the first power transmission surface 71 consisting of an end face of the inner race 391 as an intermediate member, first concave portions 66 as first engaging sections are provided. By engagement between the first convex portions 65 and the first concave portions 66, power transmission between the input member main body 201 and the inner race 391 is made possible.

Referring to FIG. 4, the output member 22 and the inner race 391 have annular second power transmission surfaces 72 and 73 facing to each other in the axial direction S of the steering shaft 3. On the second power transmission surface 72 of the output member 22, second convex portions 68 as second engageable sections are provided, and on the second power transmission surface 73 consisting of the other end face of the inner race 391 as an intermediate member, second concave portions 69 as second engaging sections are provided. By engagement between the second convex portions 68 and the second concave portions 69, power transmission between the output member 22 and the inner race 391 is made possible.

Referring to FIG. 5, on the annular first power transmission surface 70 of the input member main body 201, a plurality of grooves 301 extending in radial directions of the first power transmission surface 70 is arranged radially, and lined up at even intervals in the circumferential direction of the first power transmission surface 70. In each groove 301, a conical (or columnar) roller member 303 is fitted. A half portion of each roller member 303 projects from the groove 301, and the projecting half portion forms the first convex portion 65.

On the other hand, on the annular first power transmission surface 71 of the inner race 391, a plurality of first concave portions 66 extending in radial directions of the first power transmission surface 71 is arranged radially, and lined up at even intervals in the circumferential direction of the first power transmission surface 71. The first convex portions 65 and the first concave portions 66 have shapes substantially equal to each other.

The roller members 303 may be, as shown in FIG. 5, conical rollers the diameters of which are made smaller toward the radially inner side of the input member 20, or cylindrical rollers.

A total number of first convex portions 65 is, for example, 38. A total number of first concave portions 66 is set to be different from the total number of first convex portions 65. According to the difference between the total number of first convex portions 65 and the total number of first concave portions 66, differential rotation can be generated between the input member main body 201 and the inner race 391.

The second axis A2 of the inner race 391 is slanted at a predetermined angle B1 with respect to the first axis A1 of the input member 20, and accordingly, a part for example, several first convex portions 65) of the plurality of first convex portions 65 and a part (for example, several first concave portions 66) of the plurality of first concave portions 66 engage with each other.

Figure 6:
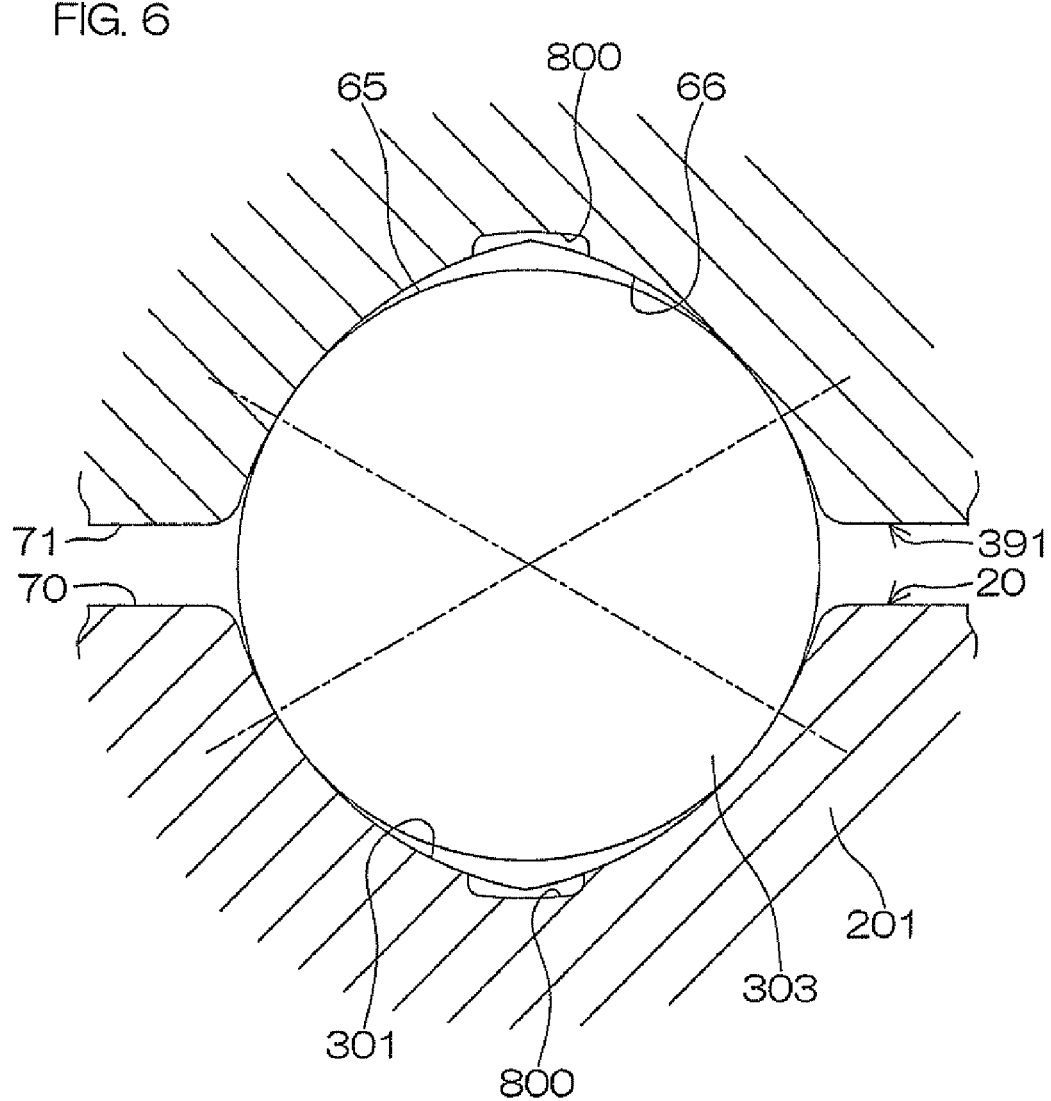
FIG. 6 is a sectional view of a first convex portion and first concave portion engaging with each other.

In FIG. 5, the shapes of the grooves 301 and the first concave portions 66 are simplified, however, in actuality, as shown in FIG. 6, the sectional shapes of the grooves 301 and the first concave portions 66 are gothic arch shapes (shapes formed by joining two arcs having radiuses equal to each other and centers different from each other). In this case, the roller member 303 forming the first convex portion 65 is supported in a four-point contact state by the groove 301 and the first concave portion 66.

On the bottom of the groove 301 and the bottom of the first concave portion 66, a grease storing portion 800 formed of a groove is provided. In this case, to the contact regions between the roller member 303 and the groove 301 and first concave portion 66, grease can be sufficiently supplied from the grease storing portions 800, so that the contact regions can be prevented from being worn and burnt for a long period of time. The shapes and depths of the grease storing portions 800 can be arbitrarily set as long as the grease storing portions are provided at positions avoiding the contact regions.

Referring to FIG. 7, on the annular second power transmission surface 72 of the output member 22, a plurality of grooves 302 extending in radial directions of the second power transmission surface 72 is arranged radially, and lined up at even intervals in the circumferential direction of the second power transmission surface 72. To each groove 302, a conical (or columnar) roller member 304 is fitted. A half portion of each roller member 304 projects from the groove 302, and the projecting half portion forms the second convex portion 68.

On the other hand, on the annular second power transmission surface 73 of the inner race 391, a plurality of second concave portions 69 extending in radial directions of the second power transmission surface 73 is arranged radially, and lined up at even intervals in the circumferential direction of the second power transmission surface 73. The second convex portions 68 and the second concave portions 69 have shapes substantially equal to each other.

The roller members 304 may be conical rollers the diameters of which are made smaller toward the radially inner side of the output member 22, or cylindrical rollers. The total number of second convex portions 68 and the total number of second concave portions 69 may be different from each other as in the case of 38 and 40, or may be equal to each other.

The second axis A2 of the inner race 391 is slanted at a predetermined angle B1 with respect to the first axis A1 of the output member 22, so that a part (for example, several second convex portions 68) of the plurality of second convex portions 68 and a part (for example, several second concave portions 69) of the plurality of second concave portions 69 engage with each other.

In FIG. 7, the shapes of the grooves 302 and the second concave portions 69 are simplified, however, in actuality, they have gothic arch shapes similar to the sectional shapes of the groove 301 and the first concave portion 66 shown in FIG. 6, and are provided with grease storing portions 800.

Figure 8:
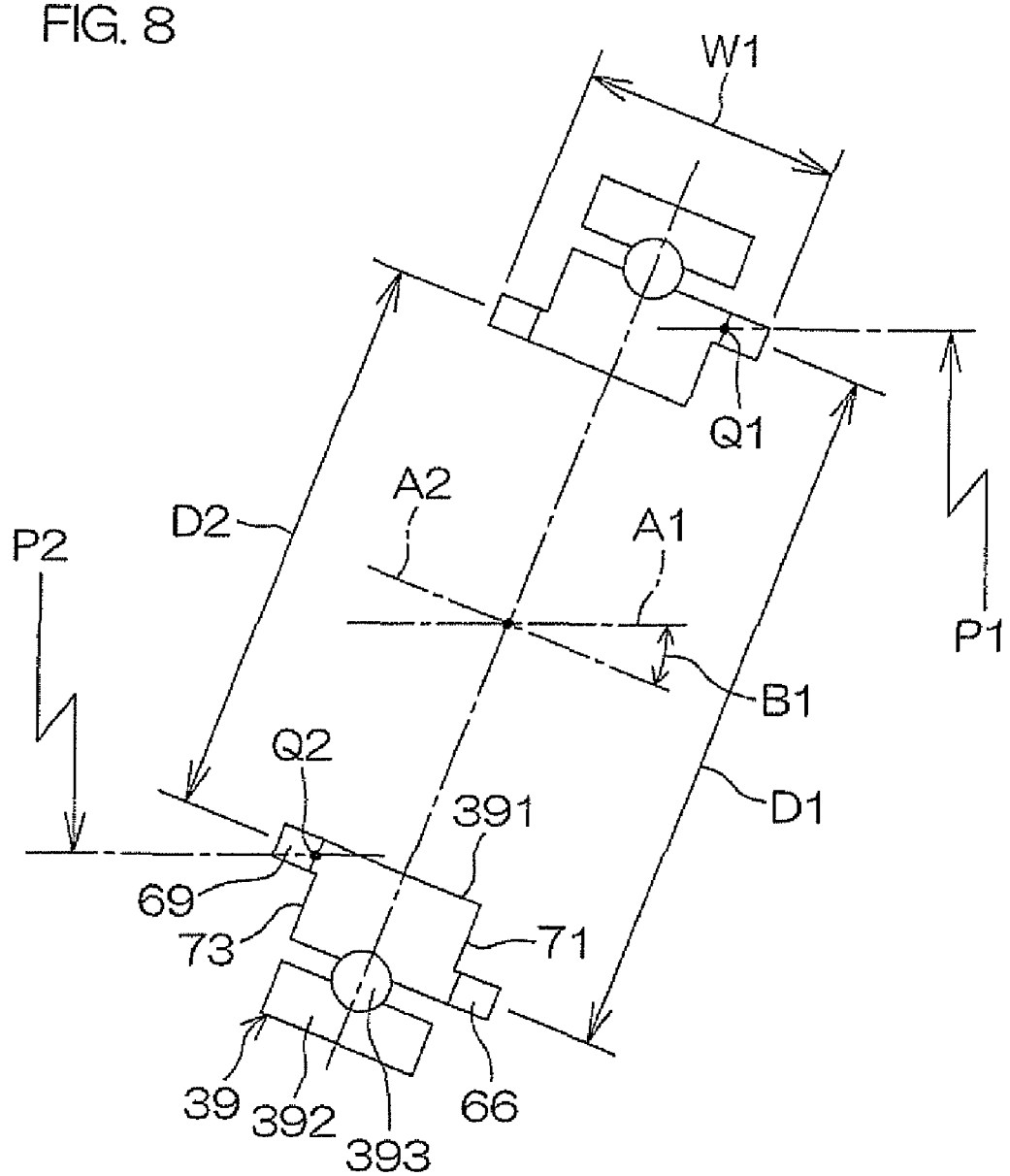
FIG. 8 is a schematic sectional view of a bearing ring unit including an inner race as an intermediate member.
Figure 10:
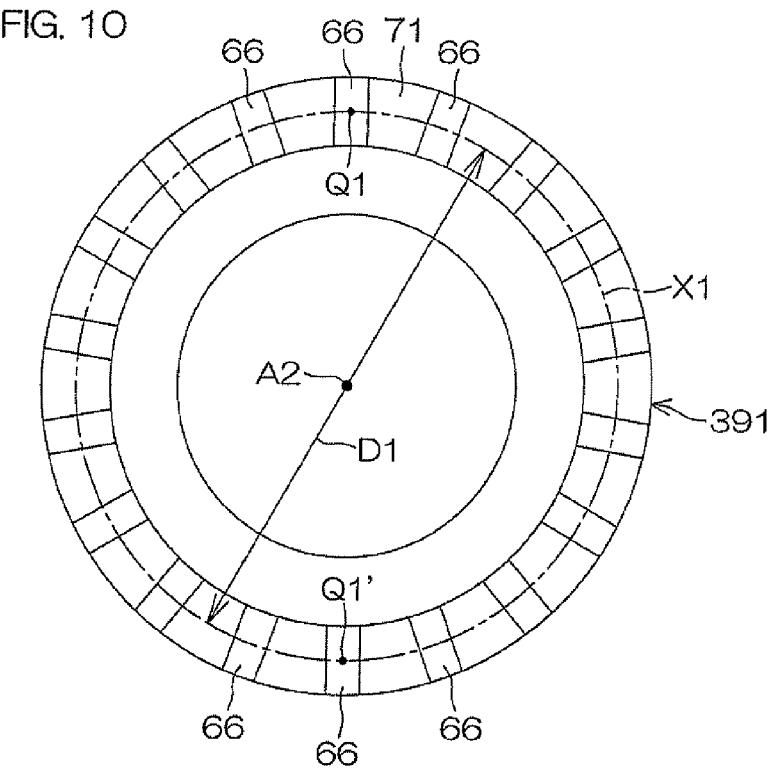
FIG. 10 is a general view of a first power transmission surface of the inner race as viewed along the second axis.
Figure 11:
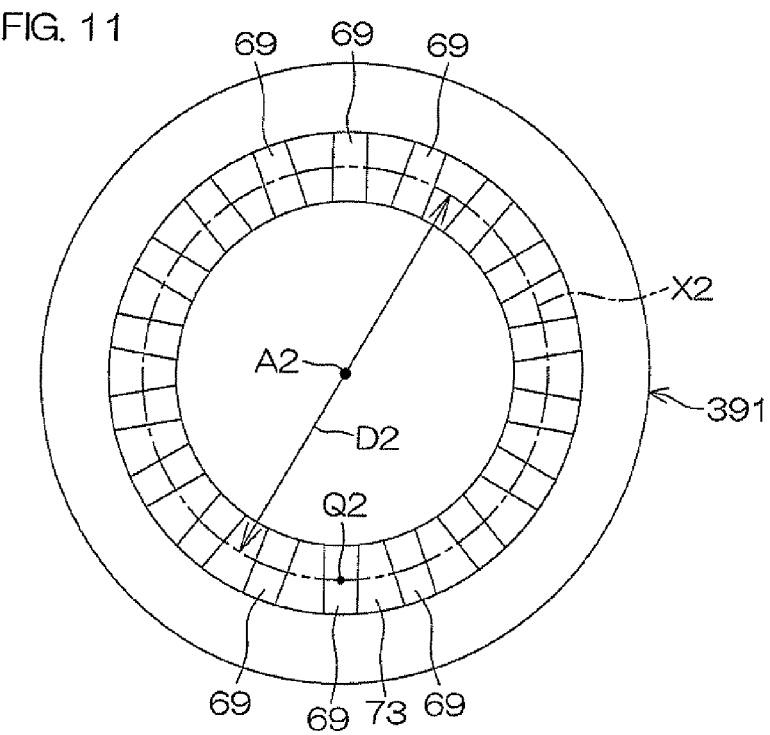
FIG. 11 is a general view of a second power transmission surface of the inner race as viewed along the second axis.

Referring to FIG. 8, FIG. 10, and FIG. 11, a diameter D1 of a first arrangement pitch circle X1 (hereinafter, referred to as a first arrangement pitch circle diameter D1) formed by the plurality of first concave portions 66 arranged annularly around the second axis A2 on the first power transmission surface 71 of the inner race 391 as an intermediate member is different from a diameter D2 of a second arrangement pitch circle X2 (hereinafter, referred to as a second arrangement pitch circle diameter D2) formed by the plurality of second concave portions 69 arranged annularly around the second axis A2 on the second power transmission surface 73 of the inner race 391. In detail, the first arrangement pitch circle diameter D1 is larger than the second arrangement pitch circle diameter D2 (D1>D2).

Figure 12:
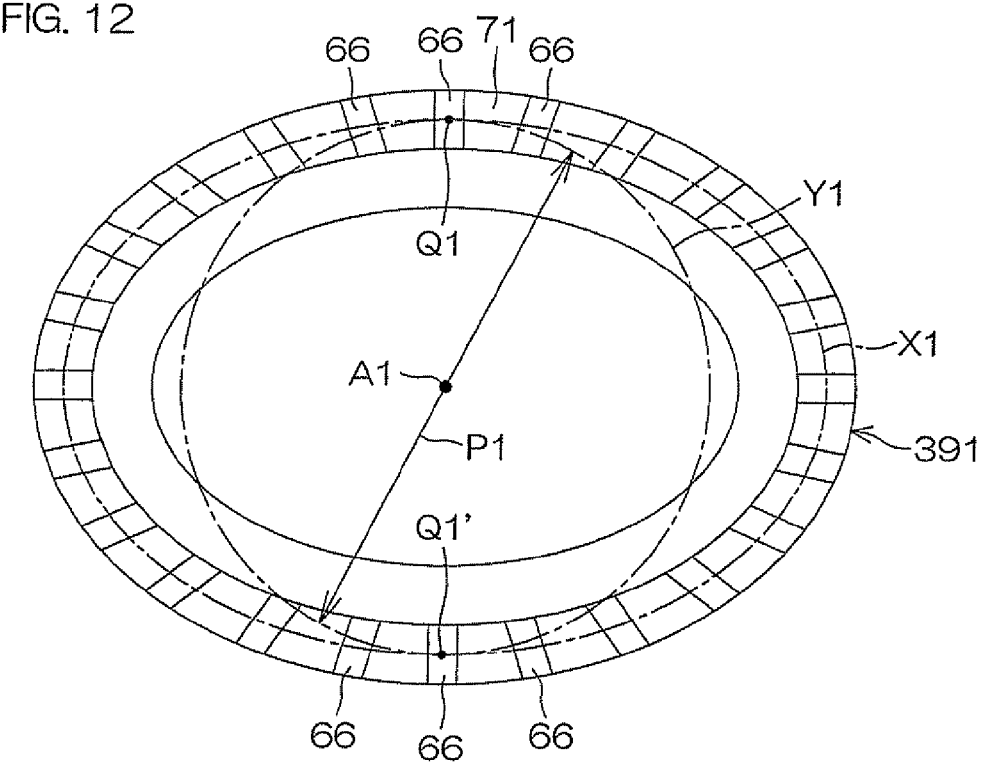
FIG. 12 is a general view of the first power transmission surface of the inner race as viewed along the first axis.

On the other hand, referring to FIG. 8 and FIG. 12, a diameter P1 of a first engagement circle Y1 (hereinafter, referred to as a first engagement circle diameter P1) centered on the first axis A1 is a diameter of an engagement circle (equivalent to an intermeshing circle) formed when the first concave portions 66 on the first power transmission surface 71 of the inner race 391 engage with the corresponding first convex portions 65 on the first power transmission surface 70 of the input member 20 at an engagement point (equivalent to an intermeshing point) Q1.

Figure 13:
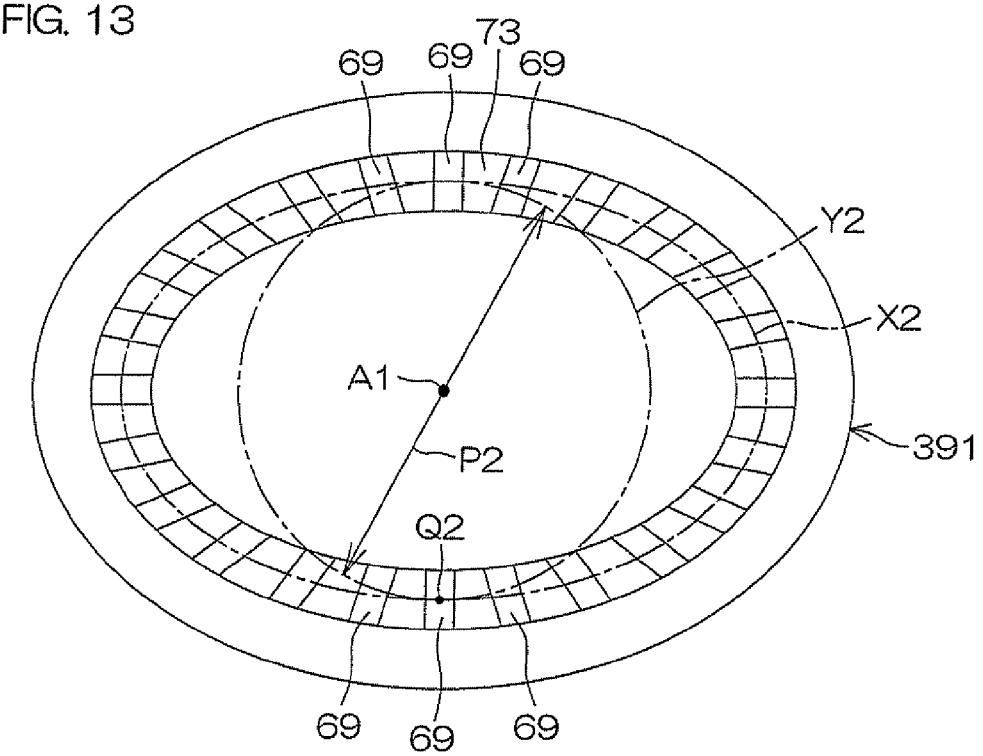
FIG. 13 is a general view of the second power transmission surface as viewed along the first axis.

Referring to FIG. 8 and FIG. 13, a diameter P2 of a second engagement circle Y2 (hereinafter, referred to as a second engagement circle diameter P2) centered on the first axis A1 is a diameter of an engagement circle (equivalent to an intermeshing circle) formed when the second concave portions 69 on the second power transmission surface 73 of the inner race 391 engage with the corresponding second convex portions 68 on the second power transmission surface 72 of the output member 22 at an engagement point (equivalent to an intermeshing point) Q2.

Figure 9:
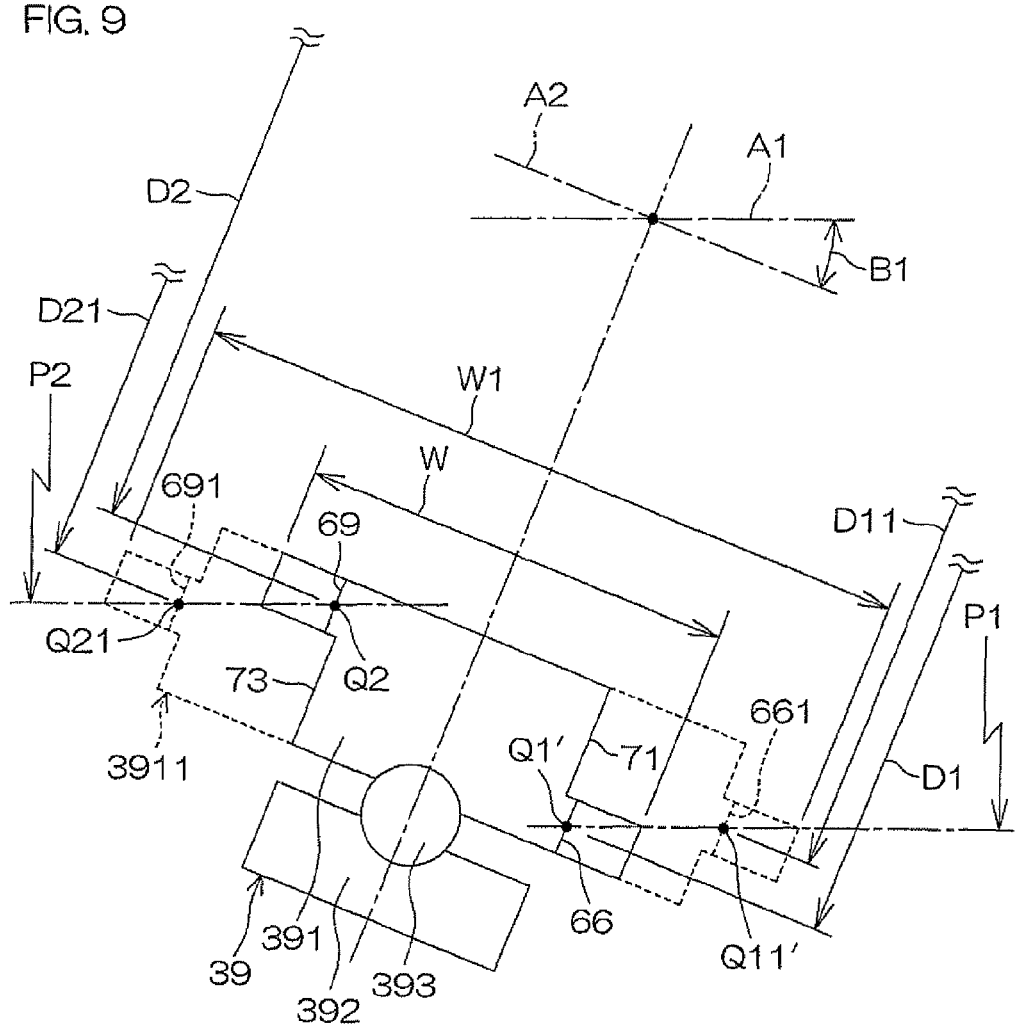
FIG. 9 is a schematic sectional view of an essential portion of the bearing ring unit including the inner race as the intermediate member.

In FIG. 9 that is a schematic view, in a direction parallel to the second axis A2, an inner race 3911 with a relatively wide width W1 before being improved is shown by a dashed line, and in a direction parallel to the second axis A2, an inner race 391 with a relatively narrow width W of the present embodiment is shown by a solid line.

In the inner race 3911 before being improved, the first arrangement pitch circle diameter D11 concerning the first concave portions 661 and the first arrangement pitch circle diameter D21 concerning the second concave portions 691 are equal to each other.

On the other hand, in the inner race 391 of the present embodiment, the first arrangement pitch circle diameter D1 concerning the first concave portions 66 and the second arrangement pitch circle diameter D2 concerning the second concave portions 69 are different from each other. In detail, the first arrangement pitch circle diameter D1 concerning the first concave portions 66 is larger than the second arrangement pitch circle diameter D2 concerning the second concave portions 69 (D1>D2).

The engagement point (intermeshing point) Q2 of the second concave portions 69 on the second power transmission surface 73 of the inner race 391 of the present embodiment and the engagement point (intermeshing point) Q21 of the second concave portions 691 of the inner race 3911 before being improved are both disposed on a cylinder with a second engagement circle diameter P2.

Thus, in order to make the width W of the inner race 391 in the direction parallel to the second axis A2 narrower than the width W1 of the inner race 3911 before being improved without changing the second engagement circle diameter P2, the second arrangement pitch circle diameter D2 concerning the second concave portions 69 around the second axis A2 is set smaller than the second arrangement pitch circle diameter D21 concerning the second concave portions 691 before being improved (D2<D21).

On the other hand, a point Q1 at a position symmetrical to the engagement point Q1' (refer to FIG. 8) of the first concave portions 66 on the first power transmission surface 71 of the inner race 391 of the present embodiment with respect to the first axis A1 and a point Q11' at a position symmetrical to the engagement point of the first concave portions 661 of the inner race 3911 before being improved with respect to the first axis A1 are both disposed on a cylinder with the first engagement circle diameter P1.

Thus, in order to make the width W of the inner race 391 in the direction parallel to the second axis A2 narrower than the width W1 of the inner race 3911 before being improved without changing the first engagement circle diameter P1, the first arrangement pitch circle diameter D1 concerning the first concave portions 69 around the second axis A2 is set larger than the first arrangement pitch circle diameter D11 concerning the first concave portions 661 before being improved (D1>D11).

Referring to FIG. 3 again, the rotor 231 of the variable transmission ratio motor 23 includes a cylindrical rotor core 85 extending in the axial direction S and a permanent magnet 86 fixed to the outer peripheral surface of the rotor core 85. On the radially inner side of the rotor core 85, the variable transmission ratio mechanism 5 and the torque sensor 44 as a steering state detection sensor are disposed.

By the rotor core 85, both of the first convex portions 65 and first concave portions 66 and the second convex portions 68 and second concave portions 69 of the variable transmission ratio mechanism 5 are surrounded across the entire circumference, and the torque sensor 44 is surrounded across the entire circumference (in FIG. 3, only the first convex portions 65, the first concave portions 66, the second convex portions 68, and the second concave portions 69 are shown). By housing the variable transmission ratio mechanism 5 and the torque sensor 44 inside the rotor core 85, the length of the housing 24 in the axial direction S can be shortened, and as a result, an energy absorbing stroke for absorbing energy of a secondary collision of the vehicle can be secured to be long. Further, a space for disposing a tilt telescopic mechanism (not shown) provided adjacent to the housing 24 can be secured.

As a material of the rotor core 85, a steel material, an aluminum alloy, a cladding material, and a resin material can be used. When a cladding material that is a composite material obtained by bonding a plurality of kinds of metals together is used, resonance can be suppressed. When a resin material is used for at least a part of the rotor core 85, rotor inertia can be reduced by the reduction in weight.

On one end of the rotor core 85, a to-be-held hole 87 is formed. On the radially inner side of this to-be-held hole 87, an annular bearing holding portion 88 is formed. The bearing holding portion 88 is disposed on an annular convex portion 89 formed on the inner peripheral side on one end of the first housing 51. By interposing the second bearing 32 between the to-be-held hole 87 and the bearing holding portion 88, one end of the rotor core 85 is supported rotatably on the first housing 51.

At the intermediate portion of the rotor core 85, a to-be-held hole 90 is formed. On the radially inner side of the to-be-held hole 90, an annular bearing holding portion 91 is provided. The bearing holding portion 91 is disposed on an annular extending portion 92 formed on the inner peripheral side on one end of the second housing 52. The annular extending portion 92 has a cylindrical shape extending from a partition portion 93 provided on the other end of the second housing 52 to one side S1 in the axial direction S, and is inserted through the rotor core 85.

By interposing a fourth bearing 34 between the to-be-held hole 90 and the bearing holding portion 91, the intermediate portion of the rotor core 85 is supported rotatably on the annular extending portion 92 of the second housing 52. By the second and fourth bearings 32 and 34 as a pair of bearings disposed across the bearing ring unit 39 in the axial direction of the rotor 231, the rotor core 85 is supported at both ends.

The permanent magnet 86 of the rotor 231 has magnetic poles alternately different in the circumferential direction C3 of the steering shaft 3, and in the circumferential direction C3, an N pole and an S pole are disposed at even intervals alternately. The permanent magnet 86 is fixed to the outer peripheral surface of the intermediate portion of the rotor core 85. The positions in the axial direction S of the permanent magnet 86 and a part of the variable transmission ratio mechanism 5 overlap each other.

The stator 232 of the variable transmission ratio motor 23 is housed in an annular first groove portion 94 formed on the other end of the first housing 51. This first groove portion 94 is opened to the other side S2 in the axial direction S.

The stator 232 includes a stator core 95 formed by laminating a plurality of electromagnetic steel sheets and magnet coils 96.

The stator core 95 includes a ring-like yoke 97 and a plurality of teeth 95 disposed at even intervals in the circumferential direction of the yoke 97 and projecting to the radially inner side of the yoke 97. The outer peripheral surface of the yoke 97 is fixed to the inner peripheral surface of the first groove portion 94 of the first housing 51 by thermal fitting, etc. Around each of the teeth 98, a magnetic coil 96 is wound.

A bus bar 99 is disposed on the other side S2 in the axial direction S with respect to the stator 232. The bus bar 99 is housed in the second housing 52 while assuming an annular shape as a whole, and is connected to each magnetic coil 96 of the variable transmission ratio motor 23. This bus bar 99 supplies electric power from the driving circuit to the magnetic coils 96. The positions in the axial direction S of the bus bar 99 and a part of the third and fourth bearings 33 and 34 overlap each other.

The lock mechanism 58 is disposed on the other side S2 in the axial direction S with respect to the bus bar 99. The lock mechanism 58 is for restricting rotation of the rotor 231 of the variable transmission ratio motor 23, and is housed in one end of the second housing 52.

The lock mechanism 58 includes a restricted portion 100 joined to the rotor core 85 rotatably integrally, and a restricting portion 101 for restricting rotation of the restricted portion 100 by engaging with the restricted portion 100. The restricted portion 100 is an annular member, and has a concave portion 102 formed on the outer peripheral surface. The concave portion 102 is formed at one or a plurality of positions in the circumferential direction of the restricted portion 100. The concave portion 102 may be provided on the rotor core 85. In this case, the rotor core 85 forms the above-described restricted portion. The positions in the axial direction S of a part of the restricted portion 100 and a part of the torque sensor 44 overlap each other.

The restricting portion 101 is disposed to face to the restricted portion 100 in the radial direction of the restricted portion 100. This restricting portion 101 is held by the second housing 52, and movable to the restricted portion 100 side. When the restricting portion 101 moves to the restricted portion 100 side and engages with the concave portion 102, rotation of the rotor core 85 is restricted.

The motor resolver 43 is disposed on the other side S2 in the axial direction S with respect to the lock mechanism 58. The motor resolver 43 is housed in a second groove portion 103 formed on the other end of the second housing 52, and positioned on the radially outer side of the rotor core 85.

The second groove portion 103 is an annular groove partitioned by an annular outer peripheral portion 104 on one end of the second housing 52 and the annular extending portion 92. The second groove 103 is communicatively connected to the first groove portion 94. By these first and second groove portions 94 and 103, the housing space 139 for housing the variable transmission ratio motor 23, the lock mechanism 58, and the motor resolver 43 is partitioned.

The motor resolver 43 and the torque sensor 44 face to each other in the radial direction R3 of the steering shaft 3. The positions in the axial direction S of a part of the motor resolver 43 and a part of the torque sensor 44 overlap each other. The motor resolver 43 includes a resolver rotor 105 and a resolver stator 106. The resolver rotor 105 is fixed to the outer peripheral surface 107 on the other end of the rotor core 85 rotatably integrally. The resolver stator 106 is press-fitted and fixed to the inner peripheral surface 108 of the outer peripheral portion 104 of the second housing 52.

The first bearing 31 supports the input member 20 rotatably. The first shaft 11 is supported rotatably on the first housing 51 via the cylindrical member 202 of the input member 20 and the first bearing 31. The first bearing 31 is surrounded by the second bearing 32, and their positions in the axial direction S overlap each other.

The third bearing 33 is interposed between a bearing holding hole 110 formed in the inner peripheral portion on the tip end of the extending portion 92 of the second housing 52 and a bearing holding portion 111 formed on the output member 22. The output member 22 is supported rotatably on the annular extending portion 92 of the second housing 52 via the third bearing 33. The third bearing 33 is surrounded by the fourth bearing 34, and their positions in the axial direction S overlap each other.

Between the first convex portions 65 and the first concave portions 66 and between the second convex portions 68 and the second concave portions 69, precompression is applied so as to realize smooth engagement between the first convex portions 65 and the first concave portions 66 and smooth engagement between the second convex portions 68 and the second concave portions 69.

In detail, on the inner peripheral portion 112 on one end of the first housing 51, a screw member 113 is disposed. The screw member 113 forms an energizing member that energizes the input member main body 201 in an energizing direction H (equivalent to the other side S2 in the axial direction S) to make the input member main body 201 approach the output member 22. This screw member 113 forms a rigid member that rigidly supports the outer race 312 of the first bearing 31 in the axial direction S. The screw member 113 applies precompression between the first convex portions 65 and the first concave portions 66 and the second convex portions 68 and between the second concave portions 69 by energizing the input member main body 201 toward the output member 22.

A male threaded portion 113a formed on the outer peripheral surface of the screw member 113 is screwed and fitted to a female threaded portion 134a of a bearing holding hole 134 formed on the inner periphery of an annular convex portion 89 on one end of the first housing 51. Accordingly, the screw member 113 energizes (presses) one end face of the outer race 312 of the first bearing 31 held in the bearing holding hole 134 of the first housing 51 in the energizing direction H. The outer race 312 of the first bearing 31 is rotatable and movable relative to the bearing holding hole 134 in the axial direction S. A lock nut 135 is provided adjacent to the screw member 113. The lock nut 135 restricts rotation of the screw member 113 in a state where the screw member is screwed and fitted to the female threaded portion 134a.

The inner race 311 of the first bearing 31 is joined to the cylindrical member 202 rotatably integrally by being press-fitted to one end of the cylindrical member 202. The inner race 311 and the input member main body 201 are rotatable integrally and movable integrally in the axial direction S via the cylindrical member 202. The inner race 311 is in contact with one end portion of the input member main body 201, and presses the input member main body 201 in the energizing direction H.

The first convex portion 65 faces to the first concave portion 66 in the energizing direction H. Similarly, the second concave portion 69 faces to the second convex portion 68 in the energizing direction H. To the output member 22, an inner race 331 of the third bearing 33 is press-fitted and fixed. A stepped portion at the central portion of the output member 22 is in contact with one end face of the inner race 331, and presses the inner race 331 in the energizing direction H. An outer race 332 of the third bearing 33 is received by an annular stepped portion 114 disposed adjacent to the bearing holding hole 110 for holding the outer race 332 movably in the energizing direction H, and accordingly, movement in the energizing direction H of the outer race 332 is restricted. Movement in the energizing direction H of the output member 22 is restricted by the third bearing 33.

With the above-described configuration, an energizing force of the screw member 113 is transmitted to the inner race 311 via the outer race 312 and a roller of the first bearing 31, and further transmitted to the input member main body 201. The energizing force transmitted to the input member main body 201 is transmitted to the first convex portions 65 and the first concave portions 66 and the second concave portions 69 and the second convex portions 68 in order, and further transmitted to the inner race 331, the roller, and the outer race 332 of the third bearing 33. The energizing force transmitted to the outer race 332 of the third bearing 33 is received by the annular stepped portion 114.

According to movement of the inner race 391 of the bearing ring unit 39 in the energizing direction H by the energizing force of the screw member 113, the roller 393 and the outer race 392 of the bearing ring unit 39 and the rotor 231 of the variable transmission ratio motor 23 move integrally in the energizing direction H.

In detail, the outer race 392 of the bearing ring unit 39 is press-fitted and fixed to a slanted hole 63 of the rotor core 85. Accordingly, the rotor core 85 holds the outer race 392 rotatably integrally around the first axis A1 and movably integrally in the axial direction S.

The outer races 322 and 342 of the second bearing 32 and the fourth bearing 34 are fitted with play remaining to the corresponding annular to-be-held holes 87 and 90 of the rotor core 85, and support the rotor core 85 movably relatively in the axial direction S. An inner race 321 of the second bearing 32 is press-fitted and fixed to the bearing holding portion 88 of the annular convex portion 89. The inner race 341 of the fourth bearing 34 is press-fitted and fixed to the bearing holding portion 91 of the annular extending portion 92 of the second housing 52.

It is also possible that the output member 22 is energized in a direction (opposite to the energizing direction H) to approach the input member main body 201 by using the screw member 113. In this case, the screw member 113 is screwed into the bearing holding hole 110 for holding the third bearing 33. The energizing force of the screw member 113 is transmitted to the third bearing 33, the output member 22, the second convex portions 68 and the second concave portions 69, the first concave portions 66 and the first convex portions 65, the input member main body 201, and the inner race 311, the roller, and the outer race 312 of the first bearing 31 in order, and received by the first housing 51.

The movement in the energizing direction H of the inner race 391 is prevented from being obstructed by the support mechanism 133. Specifically, an outer race 382 of the eighth bearing 38 of the support mechanism 133 is fitted with play remaining into the bearing holding hole 109 of the cylindrical member 202, and is movable relative to the bearing holding hole 109 in the axial direction S. The inner race 381 of the eighth bearing 38 is press-fitted and fixed to the facing end section 12a of the second shaft 12. It is also possible that the outer race 382 of the eighth bearing 38 is press-fitted and fixed into the bearing holding hole 109 and the inner race 381 is fitted with play remaining to the facing end section 12a.

The torque sensor 44 is disposed on the radially inner side of the rotor core 85 of the variable transmission ratio motor 23. The torque sensor 44 includes a multipolar magnet 115 fixed to the intermediate portion of the second shaft 12, and magnetic yokes 116 and 117 as a pair of soft magnetic materials supported on one end of the third shaft 13 and disposed within a magnetic field generated by the multipolar magnet 115 and forming a magnetic circuit.

The multipolar magnet 115 is a cylindrical permanent magnet, and has a plurality of poles (the numbers of N poles and S poles are equal to each other) magnetized at even intervals in the circumferential direction.

The magnetic yokes 116 and 117 face to the multipolar magnet 115 via a predetermined gap in the radial direction of the multipolar magnet 115, and surround the multipolar magnet 115. The magnetic yokes 116 and 117 are molded on a synthetic resin member 118. The synthetic resin member 118 is joined to one end of the third shaft 13 rotatably integrally.

The torque sensor 44 further includes a pair of magnetism collecting rings 119 and 120 that induce a magnetic flux from the magnetic yokes 116 and 117. The pair of magnetism collecting rings 119 and 120 are annular members made of a soft magnetic material, and surround the magnetic yokes 116 and 117 and are magnetically coupled to the magnetic yokes 116 and 117, respectively.

The pair of magnetism collecting rings 119 and 120 are spaced from each other and face to each other in the axial direction S. The magnetism collecting rings 119 and 120 are molded on a synthetic resin member 121. The synthetic resin member 121 is held by the annular extending portion 92 of the second housing 52.

A magnetic flux is generated in the magnetic yokes 116 and 117 according to a relative rotation amount of the second and third shafts 12 and 13. The magnetic flux is induced by the magnetism collecting rings 119 and 120, and detected by a hole IC (not shown) embedded in the synthetic resin member 121. Accordingly, a magnetic flux density corresponding to a torque applied to the second shaft 12 (steering member) can be detected.

Referring to FIG. 2, the fifth bearing 35 is disposed on the other side S2 in the axial direction S with respect to the torque sensor 44. The fifth bearing 35 is interposed between a bearing holding portion 122 formed on the outer periphery of one end of the third shaft 13 and a bearing holding hole 123 formed in the partition portion 93 of the second housing 52. The bearing holding hole 123 supports one end of the third shaft 13 rotatably via the fifth bearing 35.

The third shaft 13 surrounds the second shaft 12 and the torsion bar 14. In detail, in the third shaft 13, an insertion hole 124 opened in one end of the third shaft 13 is formed. The other end portion of the second shaft 12 is inserted through the insertion hole 124. In the second shaft 12, an insertion hole 125 extending in the axial direction S is formed, and the torsion bar 14 is inserted through the insertion hole 125.

One end of the torsion bar 14 is joined to one end of the insertion hole 125 of the second shaft 12 rotatably integrally by serration fitting, etc. The other end of the torsion bar 14 is joined to the insertion hole 124 of the third shaft 13 rotatably integrally by serration fitting, etc. The space on the radially inner side of the annular extending portion 92 of the second housing 52 is a torque sensor housing chamber 126, and a structure for preventing a lubricant from entering the torque sensor housing chamber 126 is further provided.

In detail, one end of the torque sensor housing chamber 126 is closed by the sealed third bearing 33 disposed on one end of the annular extending portion 92 of the second housing 52, the output member 22 disposed on the radially inner side of the third bearing 33, and the second shaft 12 disposed on the radially inner side of the output member 22. The other end of the torque sensor housing chamber 126 is closed by the sealed fifth bearing 35, the third shaft 13 disposed on the radially inner side of the fifth bearing 35, and the torsion bar 14 closing the insertion hole 124 of the third shaft 13.

With the above-described configuration, a lubricant filled in the first concave portions 66, the second concave portions 69, and the grooves 301 and 302, etc., can be prevented from entering the torque sensor housing chamber 126, and a lubricant filled in the engagement region between the worm shaft 27 and the worm wheel 28 of the reduction gear mechanism 26 can be prevented from entering the torque sensor housing chamber 126.

The second shaft 12 and the third shaft 13 are supported rotatably relative to each other via the sixth bearing 36. The sixth bearing 36 is surrounded by the worm wheel 28 of the reduction gear mechanism 26. The reduction gear mechanism 26 is housed in a housing chamber 128 partitioned by the outer peripheral portion 127 and the end wall portion 61 of the third housing 53 and the partition portion 93 of the second housing 52. The positions in the axial direction S of a part of the worm wheel 28 and the sixth bearing 36 overlap each other.

The seventh bearing 37 is interposed between the intermediate portion of the third shaft 13 and the end wall portion 61 of the third housing 53. The end wall portion 61 supports the third shaft 13 rotatably via the seventh bearing 37.

An inner race 371 of the seventh bearing 37 is sandwiched by an annular stepped portion 129 formed on the outer peripheral portion of the third shaft 13 and a nut 130 screwed and fitted to the outer peripheral portion of the third shaft 13. An outer race 372 of the seventh bearing 37 is sandwiched by an annular stepped portion 131 formed on the third housing 53 and a stopper ring 132 held by the third housing 53.

Next, an example of operation of the variable ratio steering device 1 will be described. Hereinafter, (i) a case where rotation of the rotor 231 of the variable transmission ratio motor 23 is restricted, (ii) a case where the rotor 231 of the variable transmission ratio motor 23 is rotating and rotation of the input member 20 is restricted, and (iii) a case where the rotor 231 of the variable transmission ratio motor 23 is rotating and the input member 20 is rotating, will be described.

In each of the cases (i), (ii), and (iii), it is assumed that a total number of first convex portions 65 is 38 and a total number of first concave portions 66 is 40, and a total number of second convex portions 68 is 40 and a total number of second concave portions 69 is 40.

In the case (i), that is, in the case where rotation of the rotor 231 of the variable transmission ratio motor 23 is restricted by the lock mechanism 58, when the first shaft 11 rotates according to an operation of the steering member, the first convex portions 65 of the input member main body 201 rotate around the first axis A1. At this time, the bearing ring unit 39 does not Coriolis-move to rotate around the first axis A1, but only the inner race 391 rotates around the second axis A2. By this rotation, the inner race 391 provided with the first concave portions 66 is rotated, and the second shaft 12 is further rotated.

As a result, when the input member 20 rotates one revolution, the inner race 391 rotates 38/40 revolutions. At this time, the outlet member 22 rotates 38/40 revolutions. That is, the rotation of the input member 22 is decelerated to 19/20.

In the case (ii), that is, in the case where the rotor 231 of the variable transmission ratio motor 23 is rotating and rotation of the input member 20 is restricted due to the steering member being held by a driver, the rotor 231 rotates around the first axis A1, and accordingly, the bearing ring unit 39 Coriolis-moves. Accordingly, the inner race 391 attempts to make the input member 20 and the output member 22 rotate opposite to each other. However, rotation of the input member 20 is restricted, so that only the output member 22 rotates.

At this time, as a result of setting of the total number of first concave portions 66 to be larger by 2 than the total number of first convex portions 65, when the outer race 392 of the bearing ring unit 39 rotates one revolution, the phase of the inner race 391 advances as much as the above-described difference (two) in the number of teeth. This becomes the rotation of the inner race 391. As a result, when the outer race 392 rotates one revolution, the inner race 391 rotates as much as the difference in the number of teeth, and the output member 22 rotates 2/40 revolutions. Accordingly, the rotation of the rotor 231 of the variable transmission ratio motor 23 is decelerated to 1/20 and output.

In the case (iii), that is, when the rotor 231 of the variable transmission ratio motor 23 is rotating and the input member 20 is rotating according to steering of the steering member by a driver, the rotation amount of the output member 22 becomes a value obtained by adding the rotation amount of the input member 20 (steering member) to the rotation amount in the case (ii) described above.

Accordingly, when the vehicle travels at a comparatively low speed, turning can be performed with a reduced operation amount of the steering member 2 by a driver by increasing the transmission ratio ($\theta 2/\theta 1$).

When the vehicle travels at a comparatively high speed, for example, the steering angle θ1 and the yaw rate γ of the vehicle are compared, and the behavior of the vehicle is judged. As a result, when the behavior of the vehicle judged from the steering angle θ1 and the behavior of the vehicle judged from the yaw rate γ do not match each other, stability control (posture stabilization control) of the vehicle is performed by accelerating or decelerating the rotation of the rotor 231 of the variable transmission ratio motor 23. At this time, driving of the rotor 231 of the variable transmission ratio motor 23 can also be controlled so that a counter-steering operation is performed.

According to the present embodiment, as shown in FIG. 9, the first arrangement pitch circle diameter D1 concerning the first concave portions 66 on the first power transmission surface 71 of the inner race 391 as an intermediate member, centered on the second axis A2, and the second arrangement pitch circle diameter D2 concerning the second concave portions 69 on the second power transmission surface 73 of the inner race 391 are made different from each other.

Accordingly, without changing the first engagement circle diameter P1 concerning the first concave portions 66 on the first power transmission surface 71, centered on the first axis A1, and the second engagement circle diameter P2 concerning the second concave portions 69 of the second power transmission surface 73, centered on the first axis A1, and without increasing the slant angle B1 of the second axis A2, the width W of the inner race 391 in a direction along the second axis A2 can be narrowed.

It is not necessary to increase the slant angle B1, so that without lowering the engagement ratio (contact ratio) between the first concave portions 66 and the first convex portions 65 and the engagement ratio (contact ratio) between the second concave portions 69 and the second convex portions 68, vibration and noise can be suppressed. Moreover, the rotor 231 of the variable transmission ratio motor 23 surrounding the bearing ring unit 39 including the inner race 391 as an intermediate member and the input member 20 and the output member 22 can be shortened in the axial direction, so that the inertia of the rotor 231 can be reduced and the responsiveness of the variable transmission ratio motor 23 can be improved. Specifically, the responsiveness of the variable transmission ratio motor 23 can be improved while vibration and noise are suppressed.

By adjusting the first arrangement pitch circle diameter D1 of the first concave portions 66 and the second arrangement pitch circle diameter D2 of the second concave portions 69, it becomes possible to reduce the slant angle B1 of the second axis A2 without changing the first engagement circle diameter P1 concerning the first concave portions 66 on the first power transmission surface 71, centered on the first axis A1, and the second engagement circle diameter P2 concerning the second concave portions 69 on the second power transmission surface 73, centered on the first axis A1. By reducing the slant angle B1, through improvement in the contact ratio between the first concave portions 66 and the first convex portions 65 and improvement in the contact ratio between the second concave portions 69 and the second convex portions 68, vibration and noise can be further reduced.

In addition, the first arrangement pitch circle diameter D1 concerning the first concave portions 66 and the second arrangement pitch circle diameter D2 concerning the second concave portions 69 are different from each other between the first power transmission surface 71 and the second power transmission surface 73 of the inner race 391 as an intermediate member, so that the first and second power transmission surfaces 71 and 73 of the inner race 391 can be easily discriminated from each other. Therefore, the inner race 391 can be prevented from being erroneously fitted.

Figure 14:
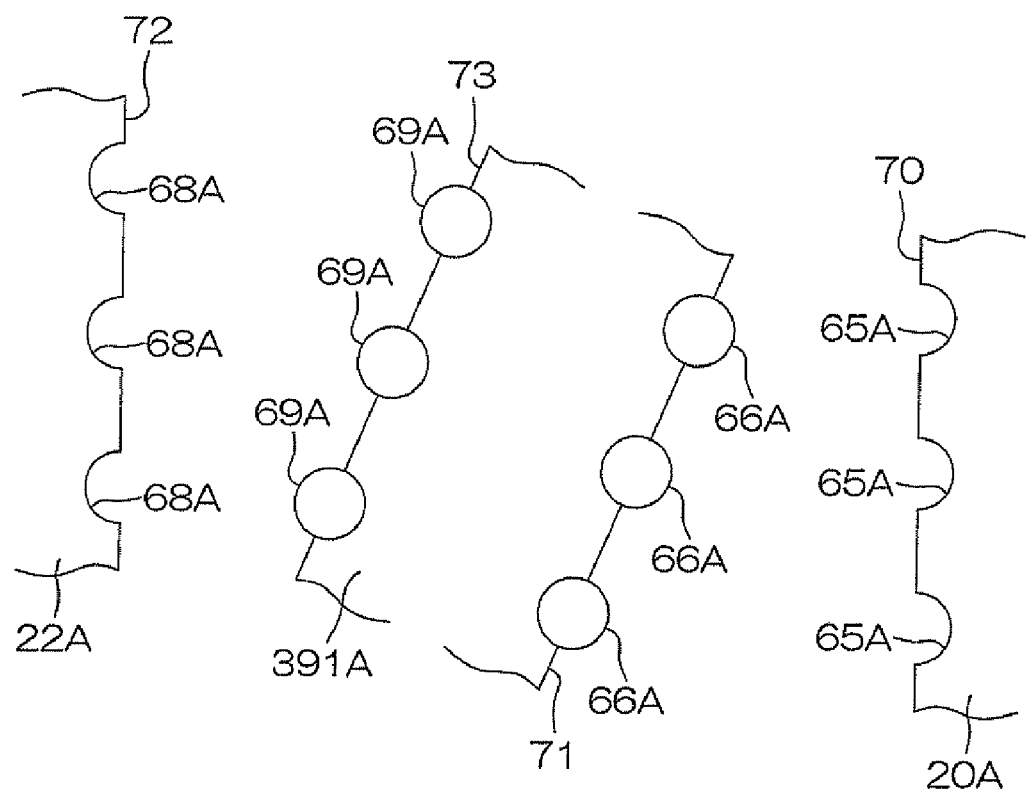
FIG. 14 is a schematic view of a variable transmission ratio mechanism according to another embodiment of the present invention.

The present invention is not limited to the above-described embodiment, and for example, as shown in FIG. 14, it is also possible that first concave portions 65A are provided as first engageable sections on the first power transmission surface 70 of the input member 20A and first convex portions 66A are provided as first engaging sections on the first power transmission surface 71 of the intermediate member 391A. Similarly, it is also possible that second concave portions 68A are provided as second engageable sections on the second power transmission surface 72 of the output member 22A and second convex portions 69A are provided as second engaging sections on the second power transmission surface 73 of the intermediate member 391A.

It is also possible that the input member main body 201 and the cylindrical member 202 are integrally formed from a single material to constitute an input member. In the embodiment described above, the intermediate member is the inner race; however, the intermediate member may be a member that rotates integrally with the inner race.

In the embodiment described above, the intermediate member is the inner race or a member that rotates integrally with the inner race, however, instead of this, the intermediate member may be the outer race or a member that rotates integrally with the outer race. In this case, the variable transmission ratio motor 23 drives the inner race.

The present invention is described in detail above according to a detailed embodiment, however, a person skilled in the art who understands the contents described above will easily conceive of alterations, modifications, and equivalents. Therefore, the present invention should cover the scope of the claims and equivalents thereof.

The present application corresponds to Japanese Patent Application No. 2008-171132 filed in Japan Patent Office on Jun. 30, 2008, the entire disclosure of which is incorporated herein by reference.

DESCRIPTION OF REFERENCE NUMERALS

1: Variable ratio steering device, 2: Steering member, 3: Steering shaft, 4L, 4R: Steerable wheel, 5: Variable transmission ratio mechanism, 10: Steerable mechanism, 11: First shaft, 12: Second shaft (member on steerable wheel side), 20, 20A: Input member, 22, 22A: Output member, 23: Variable transmission ratio motor (electric motor), 231: Rotor, 39: Bearing ring unit, 391, 391A: Inner race (intermediate member), 392: Outer race, 393: Roller, 65: First convex portion (first engageable section), 66: First concave portion (first engaging section), 68: Second convex portion (second engageable section) 69: Second concave portion (second engaging section), 65A: First concave portion (first engageable section), 66A: First convex portion (first engaging section), 68A: Second concave portion (second engaging section), 69A: Second convex portion (second engaging section), 70, 71: First power transmission surface, 72, 73: Second power transmission surface, A1: First axis, A2: Second axis, θ1: Steering angle, θ2: Steerable angle, θ2/θ1: Transmission ratio, θ: Slant angle, D1: First arrangement pitch circle diameter (diameter of first arrangement pitch circle), D2: Second arrangement pitch circle diameter (diameter of second arrangement pitch circle), P1: First engagement circle diameter (diameter of first engagement circle), P2 Second engagement circle diameter (diameter of second engagement circle), X1: First arrangement pitch circle, X2: Second arrangement pitch circle, Y1: First engagement circle, Y2: Second engagement circle

What is claimed is:

1. A variable transmission ratio mechanism comprising:
an input member rotatable around a first axis;
an output member rotatable around the first axis; and
an intermediate member joining the input member and the output member so as to allow the input member and the output member to differentially rotate, wherein
the intermediate member is rotatable around a second axis slanted with respect to the first axis,
the input member includes a first power transmission surface,
the intermediate member includes a first power transmission surface facing to the first power transmission surface of the input member, and
on the first power transmission surface of the intermediate member, a plurality of first engaging sections is arranged along a first arrangement pitch circle centered on the second axis,
on the first power transmission surface of the input member, a plurality of first engageable sections is arranged annularly around the first axis,
the first engaging sections are engageable with the first engageable sections on a first engagement circle centered on the first axis,
the output member includes a second power transmission surface,
the intermediate member includes a second power transmission surface facing to the second power transmission surface of the output member,
on the second power transmission surface of the intermediate member, a plurality of second engaging sections is arranged along a second arrangement pitch circle centered on the second axis,
on the second power transmission surface of the output member, a plurality of second engageable sections is arranged annularly around the first axis,
the second engaging sections are engageable with the second engageable sections on a second engagement circle centered on the first axis, and
a diameter of the first arrangement pitch circle and a diameter of the second arrangement pitch circle are different from each other.

2. The variable transmission ratio mechanism according to claim 1, wherein the diameter of the first arrangement pitch circle is larger than the diameter of the second arrangement pitch circle.

3. The variable transmission ratio mechanism according to claim 1, wherein
either one of the first engaging section and the first engageable section includes a concave portion, and the other one of the first engaging section and the first engageable section includes a convex portion, and
either one of the second engaging section and the second engageable section includes a concave portion, and the other one of the second engaging section and the second engageable section includes a convex portion.

4. The variable transmission ratio mechanism according to claim 1, further comprising:
an electric motor for driving the intermediate member, and
the electric motor includes an annular rotor disposed on a radially outer side of the intermediate member.

5. A variable ratio steering device comprising: a steering member; steerable wheels; and a variable steering angle ratio mechanism that varies a steering angle ratio as a ratio of a steerable angle of the steerable wheels to a steering angle of the steering member, wherein as the variable steering angle ratio mechanism, the variable transmission ratio mechanism according to claim 1 is used.

6. The variable transmission ratio mechanism according to claim 1, wherein:
either one of the first engaging section and the first engageable section includes a concave portion, and the other one of the first engaging section and the first engageable section includes a convex portion,
either one of the second engaging section and the second engageable section includes a concave portion, and the other one of the second engaging section and the second engageable section includes a convex portion, and
the convex portion is formed by a rolling member that is disposed in a groove.

7. The variable transmission ratio mechanism according to claim 1, wherein:
either one of the first engaging section and the first engageable section includes a concave portion, and the other one of the first engaging section and the first engageable section includes a convex portion,
either one of the second engaging section and the second engageable section includes a concave portion, and the other one of the second engaging section and the second engageable section includes a convex portion, and
the convex portion is formed by a rolling member that is disposed in a groove and thereby forming a grease storing portion between the rolling member and the groove.

8. The variable transmission ratio mechanism according to claim 1, further comprising:
an outer race, the outer race rotatatbly supporting the intermediate member via a roller, and
a motor that is disposed on a radially outer side of the outer race and actuates the outer race.

* * * * *